Patented June 5, 1928.

1,672,548

UNITED STATES PATENT OFFICE.

WILLIAM P. TER HORST, OF AKRON, OHIO, ASSIGNOR TO THE RUBBER SERVICE LABORATORIES COMPANY, OF AKRON, OHIO, A CORPORATION OF OHIO.

PROCESS OF MANUFACTURING VULCANIZED RUBBER.

No Drawing. Application filed May 6, 1927. Serial No. 189,463.

This invention is directed to the art of manufacturing a vulcanized rubber product by employing tetra-substituted-derivatives of guanidine as accelerators of the vulcanization process. The mode of operating the invention will be readily understood from the following specification and examples wherein the invention is fully set forth and described.

Guanidine has the formula $$C=NH\begin{matrix}NH_2\\ \\NH_2\end{matrix}$$

and is known as the amidine of carbamic acid. The five hydrogen atoms shown to be present in guanidine are replaceable by various atoms or radicals to produce a mono, di, tri, tetra, or penta substituted guanidine, depending upon the number of hydrogen atoms so replaced.

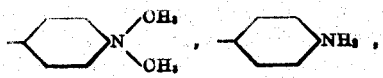

The tetra substituted guanidines of the type hereinafter set forth and which are manufactured preferably by the process described in detail comprise a class of compounds which may be represented by the formula $$C=NH\begin{matrix}NR_1R_2\\ \\NR_3R_4,\end{matrix}$$

where $R_1$, $R_2$, $R_3$ and $R_4$ indicate alkyl, aryl or cyclic groups of hydrocarbon or substitute hydrocarbon characteristics which may be the same or may be all different groupings. Such groups may comprise alkyl groups such as the methyl, ethyl, propyl, butyl group and the like, or aryl groups such as the phenyl, tolyl, and xylyl groups and substitute aryl groups, such as

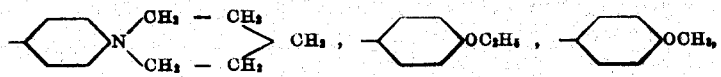

and the like. Groups of an alkaloidal type such as piperidyl, pyrollidyl, and the like have also been substituted for hydrogen atoms in guanidine, to obtain tetra-substituted derivatives of the type claimed.

An example of one such compound is dipiperidyl-guanidine wherein four of the hydrogen atoms of guanidine have been replaced in the manner shown in the following formula

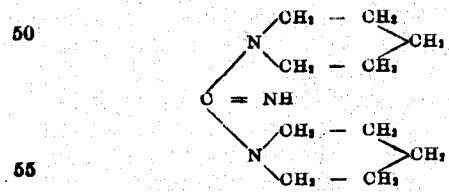

This compound was manufactured preferably by passing vapors of cyanogen chloride into piperidine maintained at a temperature slightly below its boiling point. In order to avoid substantial loss of the piperidine and of any volatile reaction products produced therefrom, a container in which the reaction was carried out was connected with a reflux condenser. The flow of cyanogen chloride was continued for a period of time sufficient to produce the hydrochloride of the desired guanidine derivative.

The reaction product so obtained was taken up with water, the water extract was filtered and the filtrate was then treated with an alkaline solution, preferably caustic soda, to obtain the free guanidine base. The alkali should be added preferably in an amount sufficient to react faintly alkaline to an indicator such as Clayton yellow. The guanidine compound formed was redissolved in hydrochloric acid and the acid neutralized by treatment with a caustic solution as before. The di-piperidyl-guanidine so obtained was then washed until substantially free from soluble salts and was then dried in any suitable manner, preferably in vacuo. The product is then ready for use as an accelerator of the rubber vulcanization process but can be further purified, if desired, by treatment with any suitable material, such as benzol.

Another reaction product which is a tetra substituted guanidine of the type set forth herein was obtained by reacting ethyl-o-toluidine with cyanogen chloride in the manner as described. The reaction product obtained possessed the following structure:

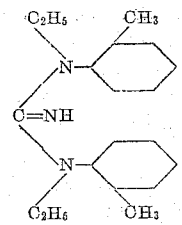

In a like manner, phenyl-methyl-p-tolyl-guanidine has been obtained by reacting cyanogen chloride upon a mixture of equimolecular proportions of aniline and methyl-p-toluidine. In a similar manner other tetra substituted guanidines have been manufactured by reacting cyanogen chloride substantially in the manner as described with the desired amino compound, mixtures of amino compounds or a derivative or derivatives thereof.

The following is an example illustrative of the use of a tetra substituted guanidine as an accelerator in the rubber vulcanization process. A rubber mix comprising 100 parts of pale crepe rubber,
5 parts of zinc oxide,
3.5 parts of sulphur, and
0.5 parts of di-piperidyl-guanidine, was manufactured in the usual manner and the rubber compound so obtained was vulcanized by heating in a press subjected to the temperature given by forty pounds of steam pressure per square inch. Portions of the rubber compound heated as described for fifteen and thirty minutes respectively were tested and the following results obtained:

| Time of heating | Temperature of heating | Modulus of elasticity at elongation of— | | | Tensile at break in lbs/in² | Ultimate elongation |
| --- | --- | --- | --- | --- | --- | --- |
| | | 300% | 500% | 700% | | |
| 15 min | 287° | 111 | 186 | 584 | 2218 | 945% |
| 30 min | 287° | 174 | 395 | 1760 | 3830 | 870% |

Another example illustrative of the use of the new accelerating compounds herein disclosed is the following rubber mix which comprises a typical tread stock. Such a mix comprises:

36.5 parts smoked sheet rubber,
20.0 parts No. 2 amber rubber,
25.0 parts carbon black,
2.0 parts sulphur,
1.0 part a blended vegetable and mineral oil,
1.0 part stearic acid,
3.5 parts mineral rubber,
11.0 parts zinc oxide,
1.0 part di-piperidyl-guanidine.

The rubber mix was then vulcanized by heating for approximately sixty minutes in a press maintained at a temperature of 287° F. (a temperature given by forty pounds of steam pressure per square inch). The vulcanized product was found upon testing to possess a modulus of elasticity at 300% elongation of 1915 pounds per square inch, at 500% elongation of 4115 pounds per square inch, a tensile strength at break of 4590 pounds per square inch and an ultimate elongation of 515%.

A hard rubber compound of high quality was obtained by heating for about two hours and forty-five minutes in a press maintained at 287° F., a rubber mix comprising:

20 parts No. 2 amber crepe rubber,
20 parts smoked sheet rubber,
5 parts lime,
27.5 parts sulphur,
10 parts mineral rubber,
17.5 parts zinc oxide,
0.5 part di-piperidyl-guanidine.

Other tetra substituted guanidine compounds have also been employed as vulcanization accelerators. Thus, in a rubber mix comprising 100 parts of pale crepe rubber,
3.5 parts of sulphur, and
5 parts of zinc oxide, I have successfully used as an accelerator 0.5 parts of a tetra substituted guanidine resulting from the reaction of ethyl-o-toluidine, or a mixture of aniline and methyl-p-toluidine and other like compounds in the manner as described with cyanogen chloride.

The examples hereinbefore given are to be understood as illustrative only and not at all limitative of the scope of my invention. Other compounding ingredients and other proportions of these ingredients and of the accelerator set forth than were used in the various examples given may be employed to produce rubber compounds of a desired type. Moreover other means of manufacturing the particular accelerators claimed may be employed, if desired. The invention is to be considered as limited only by the following claims wherein I intend to claim my invention as broadly as is permissible in view of the prior art.

What I claim is:

1. The process of treating rubber or similar substances which comprises combining with the rubber compound a vulcanizing agent and a tetra substituted guanidine accelerator.

2. The process of manufacturing vulcanized rubber which comprises combining with the rubber compound a vulcanizing agent and a tetra substituted guanidine accelerator, such accelerator possessing the formula

where $R_1$, $R_2$, $R_3$ and $R_4$ represent organic radicals.

3. The process of manufacturing vulcanized rubber which comprises combining with the rubber compound a vulcanizing agent and a tetra substituted guanidine accelerator, said accelerator possessing the formula

where $R_1$ and $R_3$ represent organic radicals and $R_2$ and $R_4$ represent groups possessing a ring structure.

4. The process of manufacturing vulcanized rubber which comprises combining with the rubber compound a vulcanizing agent and a tetra substituted guanidine accelerator, said accelerator possessing the formula

where X and $X_1$ represent groupings of an alkaloidal type.

5. The process of manufacturing vulcanized rubber which comprises combining with the rubber compounds a vulcanizing agent and a tetra substituted guanidine accelerator, said accelerator possessing the formula

where X and $X_1$ represent piperidyl groupings.

6. The process of manufacturing vulcanized rubber which comprises heating a mixture of rubber and sulphur with a relatively small proportion of di-piperidyl-guanidine.

7. As a new product, a vulcanized rubber derived from rubber, a vulcanizing agent and a vulcanizing ingredient comprising a tetra-substituted-guanidine accelerator.

8. As a new product, a vulcanized rubber derived from rubber, a vulcanizing agent and a vulcanizing ingredient comprising a tetra-substituted-guanidine accelerator, said accelerator possessing the formula

where $R_1$, $R_2$, $R_3$ and $R_4$ represent organic radicals.

9. As a new product, a vulcanized rubber derived from rubber, a vulcanizing agent and a vulcanizing ingredient comprising a tetra-substituted-guanidine accelerator, said accelerator possessing the formula

where $R_1$ and $R_3$ represent organic radicals and $R_2$ and $R_4$ represent groups possessing a ring structure.

10. As a new product, a vulcanized rubber derived from rubber, a vulcanizing agent and a vulcanizing ingredient comprising a tetra-substituted-guanidine accelerator, said accelerator possessing the formula

where X and $X_1$ represent groupings of an alkaloidal type.

11. As a new product, a vulcanized rubber derived from rubber, a vulcanizing agent and a vulcanizing ingredient comprising a tetra-substituted-guanidine accelerator, said accelerator possessing the formula

where X and $X_1$ represent piperidyl groupings.

12. A rubber product obtained by heating a mixture of rubber and sulphur in the presence of a small proportion of an accelerator comprising di-piperidyl-guanidine.

In testimony whereof I affix my signature.

WILLIAM P. TER HORST.